United States Patent
Murakoshi et al.

(10) Patent No.: US 8,297,826 B2
(45) Date of Patent: Oct. 30, 2012

(54) BACKLIGHT UNIT AND DISPLAY DEVICE INCLUDING THE SAME

(75) Inventors: Kenichi Murakoshi, Osaka (JP); Tsuyoshi Ono, Osaka (JP); Hidekazu Fujii, Osaka (JP); Yasuaki Hirano, Osaka (JP); Makoto Hirota, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 12/958,452

(22) Filed: Dec. 2, 2010

(65) Prior Publication Data

US 2011/0199790 A1   Aug. 18, 2011

(30) Foreign Application Priority Data

Feb. 16, 2010   (JP) ................. 2010-030851

(51) Int. Cl.
    *F21V 7/04*   (2006.01)
(52) U.S. Cl. ............... 362/612; 362/97.3; 362/613
(58) Field of Classification Search ............ 362/97.3, 362/249.02, 612–613, 800; 349/65–69
    See application file for complete search history.

(56) References Cited

U.S. PATENT DOCUMENTS

2009/0213301 A1   8/2009  Tanabe

FOREIGN PATENT DOCUMENTS

| JP | 2008-84537 A | 4/2008 |
| WO | WO 2006/027883 A1 | 3/2006 |

*Primary Examiner* — Jason Moon Han
(74) *Attorney, Agent, or Firm* — Birch, Stewart, Kolasch & Birch, LLP

(57) ABSTRACT

Provided is a backlight unit capable of reducing luminance unevenness. The backlight unit includes a plurality of dot light sources and a light guide plate in which a predetermined side surface serves as a light incident surface for introducing light from the plurality of dot light sources. The plurality of dot light sources are classified into a first light source group and a second light source group. A mount point of the first light source group and a mount point of the second light source group are displaced from each other in a thickness direction of the light guide plate. A total luminance of the first light source group is higher than a total luminance of the second light source group.

9 Claims, 12 Drawing Sheets

BACKLIGHT UNIT AND DISPLAY DEVICE INCLUDING THE SAME

This application is based on Japanese Patent Application No. 2010-030851 filed on Feb. 16, 2010, the contents of which are hereby incorporated by reference.

BACKGROUND OF THE INVENTION

1. Field of the Invention

The present invention relates to a backlight unit and a display device including the same.

2. Description of Related Art

A liquid crystal display device, which is a kind of a display device, includes a liquid crystal display panel for displaying an image. The liquid crystal display panel does not emit light, and hence a backlight unit is placed on a rear surface side of the liquid crystal display panel (side opposite to a display surface side of the liquid crystal display panel) so that the liquid crystal display panel is illuminated by the backlight unit, to thereby enable display operation.

As a light source to be used for the backlight unit, there is known a cold cathode fluorescent lamp formed of a fluorescent tube sealing mercury or xenon therein. However, when the cold cathode fluorescent lamp is employed as the light source for the backlight unit, there has been inconvenience as follows. That is, the cold cathode fluorescent lamp fails to attain a sufficient light-emitting luminance and sufficient life. In particular, the luminance on a low-pressure side is lowered, which makes it difficult to attain well-balanced luminance.

In order to resolve the above-mentioned inconvenience, there is proposed a backlight unit which employs, as the light source, a light emitting diode (LED) instead of the cold cathode fluorescent lamp. Such a backlight unit is disclosed, for example, in JP 2008-84537 A. When the LED is employed as the light source as in the backlight unit thus proposed, a high luminance may be attained with low power consumption. In addition, environmental load may also be reduced.

It should be noted that there are various methods of producing white light by using the LED. For example, one of the methods is to use a phosphor which converts blue (blue-violet) LED light into yellow light, in combination with a blue LED (blue-violet LED). Another one is to use phosphors converting blue (blue-violet) LED light into green light and red light, respectively, in combination with a blue LED (blue-violet LED). There is still another method which uses three kinds of LEDs, namely, a blue LED, a green LED, and a red LED in combination.

The backlight unit placed in the liquid crystal display device generally falls into two types, namely, a direct type and an edge light type.

Their structures are described briefly. A direct type backlight unit has a light source placed immediately below a liquid crystal display panel, and light emitted from the light source illuminates the liquid crystal display panel through optical sheets (a diffusing sheet, a lenticular sheet, a polarizing sheet, and the like).

An edge light type backlight unit, on the other hand, has a light guide plate placed immediately below a liquid crystal display panel, and has a light source opposed to a predetermined side surface of the light guide plate. In illumination operation of the edge light type backlight unit, light emitted from the light source is introduced into the light guide plate from the predetermined side surface of the light guide plate. The light introduced into the light guide plate is repeatedly reflected, exits in a planar manner from a front surface of the light guide plate (the surface facing toward the liquid crystal display panel), and then illuminates the liquid crystal display panel through optical sheets.

Those two types of backlight units have their respective uses. Liquid crystal display devices that are focused on being slim employ edge light type backlight units which are advantageous in reducing thickness.

In an edge light type backlight unit that uses an LED, a plurality of LEDs are mounted on the same printed board to constitute a module, and the LED module is placed to oppose a predetermined side surface, namely, a light incident surface, of a light guide plate.

A concrete structure of the LED module is as illustrated in FIG. 18, and includes at least a plurality of LEDs 101 and a printed board 102 having a mounting surface 102a on which the plurality of LEDs 101 is mounted. The plurality of LEDs 101 are arranged in the longitudinal direction of the printed board 102. Metal wiring patterns 103 are provided on a surface of the printed board 102 where the mounting surface 102a is located. The plurality of LEDs 101 are bonded (mounted) to the metal wiring patterns 103 and thus electrically connected to one another in series.

The printed board 102 also has fixing portions (for example, notches) 102b formed along one longer side S101 of the printed board 102 and the other longer side S102 thereof, respectively, in order to fix the printed board 102. The printed board 102 is fixed by fastening the fixing portions 102b of the printed board 102 to a chassis (not shown) with screws or the like.

The LED module of FIG. 18 needs to be thin because, as mentioned above, edge light type backlight units are often employed in liquid crystal display devices that are focused on being slim. The width of the printed board 102 in the shorter-side direction is therefore usually set as small as around 10 mm.

The metal wiring patterns 103 are provided on the same surface of the printed board 102 as the mounting surface 102a. The distance between one metal wiring pattern 103 and another metal wiring pattern 103 or the distance from an outer edge of the printed board 102 to one of the metal wiring patterns 103 is called a creepage distance, which needs to be long enough to ensure the insulation of the metal wiring patterns 103. The necessary creepage distance, which varies depending on how high voltage is applied to the metal wiring patterns 103, is approximately 1 mm when the maximum voltage applied to the metal wiring patterns 103 is 200 V to 300 V.

If the LED module of FIG. 18 does not have a sufficient creepage distance between partial metal wiring patterns 103a of the metal wiring patterns 103 and the fixing portions 102b of the printed board 102, the partial metal wiring patterns 103a of the metal wiring patterns 103 need to be displaced toward the longer side S102 of the printed board 102. In other words, the mount point of the LEDs 101 that are to be bonded to the partial metal wiring patterns 103a of the metal wiring patterns 103 (hereinafter, referred to as LEDs 101a) needs to be displaced toward the longer side S102 of the printed board 102 with respect to the mount point of the other LEDs 101 (hereinafter, referred to as LEDs 101b).

This displacement may be made, for example, as illustrated in FIGS. 19 and 20, where the mount point of each LED 101a is off the center of a light incident surface 104a of a light guide plate 104 in the thickness direction of the light guide plate 104, and the mount point of each LED 101b is closer to the center of the light incident surface 104a of the light guide plate 104. In this method, however, one of components of light indicated by arrows L101 to L104, specifically, the component of light corresponding to the arrow L101, misses a region which light emitted from the LED 101a enters (see FIG. 19) out of all regions of the light incident surface 104a of the light guide plate 104. A region which light emitted from the LED 101b enters (see FIG. 20), on the other hand, makes use of all the components of light indicated by the arrows L101 to L104. The arrows illustrated in FIGS. 19 and 20 schematically represent light emitted from each LED 101.

Consequently, the difference increases between the light incidence efficiency in regions of the light incident surface 104a of the light guide plate 104, which light emitted from the LEDs 101a enters, and the light incidence efficiency in regions of the light incident surface 104a, which light emitted from the LEDs 101b enters. This hinders light from uniformly entering all regions of the light incident surface 104a of the light guide plate 104 and results in uneven luminance.

The uneven luminance is prevented by displacing the mount point of the LEDs 101b toward the longer side S102 of the printed board 102 along with the mount point of the LEDs 101a, and thus aligning all of the plurality of LEDs 101 on the same straight line running in the longitudinal direction of the printed board 102. However, displacing the mount point of the LEDs 101b toward the longer side S102 of the printed board 102 makes it difficult to secure a necessary creepage distance from partial metal wiring patterns 103b of the metal wiring patterns 103 (see FIG. 18).

Another possible method of preventing the uneven luminance is to increase the thickness of the light guide plate 104. A drawback of this method is that it presents an obstacle in reducing the thickness of a liquid crystal display device.

SUMMARY OF THE INVENTION

The present invention has been made in order to solve the above-mentioned problems, and therefore, it is an object of the present invention to provide a backlight unit capable of reducing unevenness in luminance, and a display device including the same.

In order to achieve the above-mentioned object, a backlight unit according to a first aspect of the present invention includes: a substrate which has an elongated shape and a mounting surface; a plurality of dot light sources which are mounted on the mounting surface of the substrate and arranged in a longitudinal direction of the substrate; and a light guide plate which has a plurality of elongated side surfaces and which is placed so that a predetermined side surface of the plurality of elongated side surfaces opposes the mounting surface of the substrate, the predetermined side surface serving as a light incident surface into which light from the plurality of dot light sources is introduced. Then, the plurality of dot light sources are classified into a first light source group and a second light source group, and a mount point of the first light source group and a mount point of the second light source group are displaced from each other in a thickness direction of the light guide plate. A total luminance of the first light source group is higher than a total luminance of the second light source group. The luminance (unit: $cd/m^2$) indicates the intensity of brightness and means the luminosity per unit area.

In the backlight unit according to the first aspect which is structured as above, the total luminance of the first light source group is set higher than the total luminance of the second light source group. Therefore, placing the mount point of the first light source group off the center of the light incident surface of the light guide plate in the thickness direction of the light guide plate does not lower the light incidence efficiency in regions which light emitted from the first light source group enters out of all regions of the light incident surface of the light guide plate.

In other words, even though the mount point of the first light source group and the mount point of the second light source group are displaced from each other in the thickness direction of the light guide plate, placing the mount point of the second light source group closer to the center of the light incident surface of the light guide plate while placing the mount point of the first light source group off the center of the light incident surface of the light guide plate in the thickness direction of the light guide plate reduces the difference between the light incidence efficiency in regions which light emitted from the first light source group enters out of all regions of the light incident surface of the light guide plate and the light incidence efficiency in regions of the light incident surface which light emitted from the second light source group enters. Light incidence is thus made substantially uniform throughout all the regions of the light incident surface of the light guide plate, and uneven luminance is accordingly reduced.

In the backlight unit according to the first aspect described above, it is preferred that the mount point of the first light source group be off a center of the light incident surface of the light guide plate in the thickness direction of the light guide plate, and that the mount point of the second light source group be closer to the center of the light incident surface of the light guide plate. With this structure, the difference is easily made small between the light incidence efficiency in the regions which light emitted from the first light source group enters out of all the regions of the light incident surface of the light guide plate and the light incidence efficiency in the regions of the light incident surface which light emitted from the second light source group enters.

In the backlight unit according to the first aspect described above, it is preferred that the substrate have a fixing portion formed near the mount point of the first light source group along one longer side of the substrate in order to fix the substrate, and that the mount point of the first light source group and the mount point of the second light source group be displaced from each other in the thickness direction of the light guide plate by displacing the mount point of the first light source group from the one longer side of the substrate toward another longer side of the substrate with respect to the mount point of the second light source group. With this structure, when the plurality of dot light sources are bonded (mounted) to a metal wiring pattern, which is provided on the same surface of the substrate as the mounting surface, a portion of the metal wiring pattern, which is bonded to dot light sources belonging to the first light source group can be displaced from the one longer side of the substrate toward the another longer side of the substrate with respect to a portion of the metal wiring pattern, which is bonded to dot light sources belonging to the second light source group. In this manner, although the fixing portion for fixing the substrate is formed near the mount point of the first light source group along the one longer side of the substrate, a sufficient distance is secured between the metal wiring pattern and the fixing portion of the substrate. In other words, a sufficient creepage distance is secured. With a sufficient creepage distance secured, the reliability is improved.

In the structure in which the substrate has the fixing portion formed near the mount point of the first light source group along the one longer side of the substrate in order to fix the substrate, the fixing portion of the substrate may include a notch cut into the substrate from the one longer side of the substrate toward another longer side of the substrate.

Further, in the structure in which the substrate has the fixing portion formed near the mount point of the first light source group along the one longer side of the substrate in order to fix the substrate, it is preferred that the substrate have a metal wiring pattern provided on the same surface of the substrate as the mounting surface, and the plurality of dot light sources be bonded to the metal wiring pattern, and that a portion of the metal wiring pattern, which is bonded to dot light sources belonging to the first light source group be displaced from the one longer side of the substrate toward the another longer side of the substrate with respect to a portion of the metal wiring pattern, which is bonded to dot light sources belonging to the second light source group. This structure facilitates the securing of a sufficient distance between the metal wiring pattern and the fixing portion of the substrate, namely, a sufficient creepage distance.

In the backlight unit according to the first aspect described above, it is preferred that dot light sources belonging to the first light source group be larger in luminous flux than dot light sources belonging to the second light source group. With this structure, the total luminance of the first light source group is easily made higher than the total luminance of the second light source group. The luminous flux (unit: lm) means the amount of light.

In the backlight unit according to the first aspect described above, the first light source group may be higher in mount density than the second light source group. With this structure, the total luminance of the first light source group is easily made higher than the total luminance of the second light source group.

In the structure in which the first light source group is higher in mount density than the second light source group, it is preferred that dot light sources belonging to the first light source group and dot light sources belonging to the second light source group have an equal luminous flux. This structure eliminates the need to prepare different types of dot light sources having different luminous fluxes. In this structure in which the first light source group is higher in mount density than the second light source group, the first light source group can have a higher total luminance than that of the second light source group despite the dot light sources that belong to the first light source group and the dot light sources that belong to the second light source group having an equal luminous flux.

A display device according to a second aspect of the present invention includes the backlight unit according to the first aspect. The display device structured as this has less chance of uneven luminance.

DETAILED DESCRIPTION OF PREFERRED EMBODIMENTS

First Embodiment

A display device that includes a backlight unit according to a first embodiment of the present invention is described below with reference to FIGS. 1 to 7.

Figure 1:
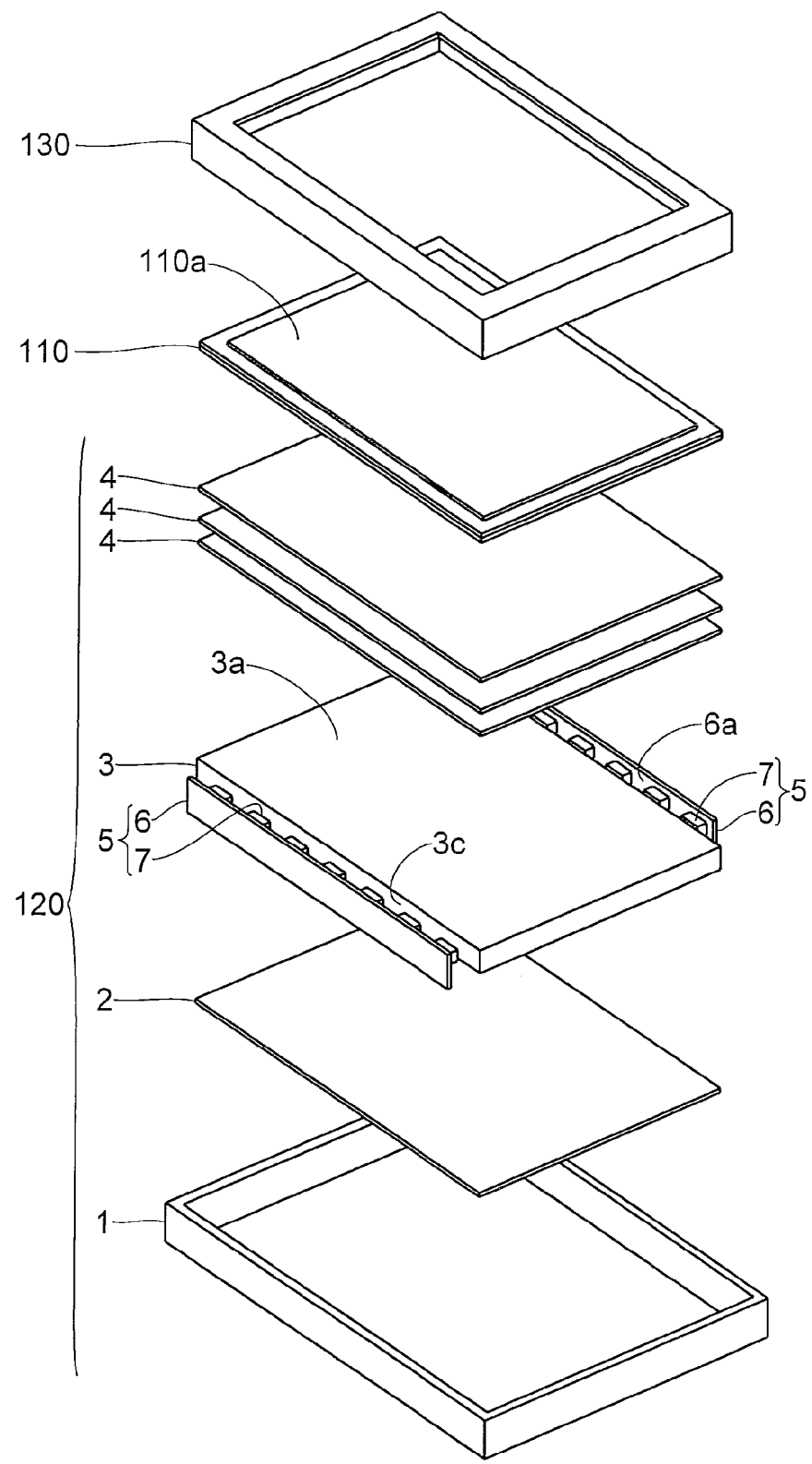
FIG. 1 is an exploded perspective view of a backlight unit (liquid crystal display device) according to a first embodiment of the present invention.

This display device is a liquid crystal display device and, as illustrated in FIG. 1, includes at least a liquid crystal display panel 110, which has a display surface 110a, and an edge light type backlight unit 120, which is placed on the rear surface side of the liquid crystal display panel 110 (side opposite to the display surface 110a side). With the backlight unit 120 set in place on the rear surface side of the liquid crystal display panel 110, a bezel 130 is attached to the same side of the liquid crystal display panel 110 as the display surface 110a. During display operation, the backlight unit 120 emits light in a planar manner and illuminates the rear surface of the liquid crystal display panel 110 with the light.

To describe a concrete structure of the display device, the liquid crystal display panel 110 includes at least a liquid crystal layer, a pair of glass substrates, and polarizing plates. The glass substrates constituting a pair are bonded to each other sandwiching a sealant. The liquid crystal layer is held between the pair of substrates. One polarizing plate is placed on each of the pair of glass substrates on the opposite side from the liquid crystal layer side.

Figure 2:
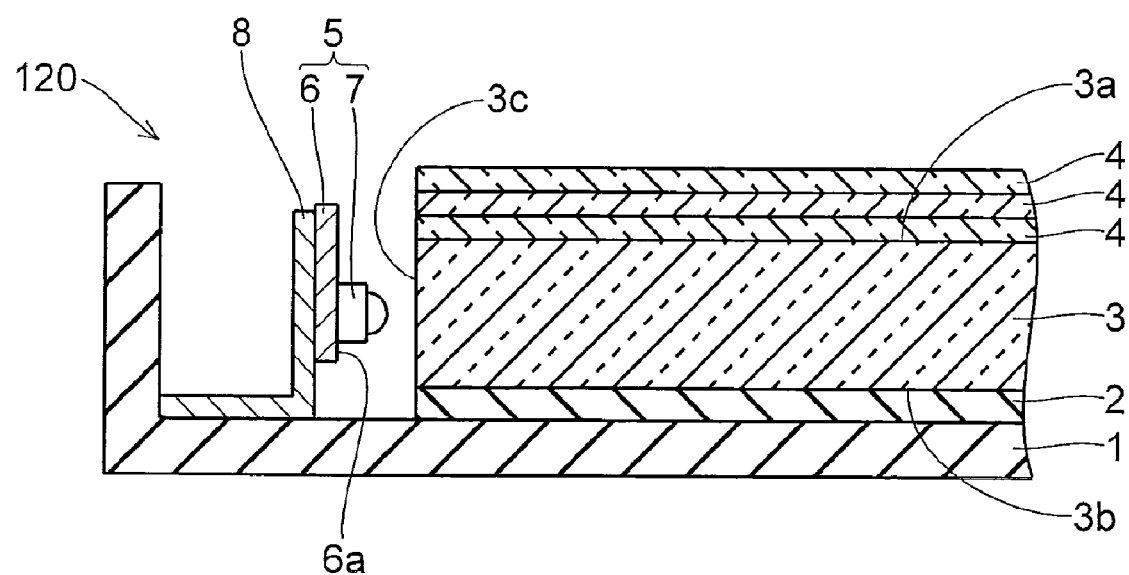
FIG. 2 is a sectional view of the backlight unit according to the first embodiment.

The backlight unit 120 includes, as illustrated in FIGS. 1 and 2, at least a back chassis 1, a reflective sheet 2, a light guide plate 3, optical sheets 4, and light source modules 5.

The back chassis 1 is formed into a substantially box-like shape opened toward the liquid crystal display panel 110. In other words, the back chassis 1 has a bottom and side walls erected along the perimeter of the bottom. The side walls of the back chassis 1 enclose a housing area in which the reflective sheet 2, the light guide plate 3, the optical sheets 4, and the light source modules 5 are housed.

The reflective sheet 2 is put on the bottom of the back chassis 1 to cover a rear surface 3b of the light guide plate 3 which is described later. An advantage of including the reflective sheet 2 is that, in the event of light leakage from the rear surface 3b of the light guide plate 3, the light leaked from the rear surface 3b of the light guide plate 3 is reflected by the reflective sheet 2 to be introduced again into the light guide plate 3.

The light guide plate 3 has a front surface 3a, the rear surface 3b, which is opposite from the front surface 3a, and four side surfaces, which are connected to the front surface 3a and the rear surface 3b. The light guide plate 3 is put on the reflective sheet 2, with the front surface 3a facing toward the liquid crystal display panel 110 and the rear surface 3b facing the reflective sheet 2.

Of the four side surfaces of the light guide plate 3, a pair of side surfaces 3c which are parallel to each other functions as light incident surfaces for introducing light into the light guide plate 3. Light introduced into the light guide plate 3 through the side surfaces 3c of the light guide plate 3 exits from the front surface 3a of the light guide plate 3 toward the liquid crystal display panel 110. In other words, the front surface 3a of the light guide plate 3 functions as a light exit surface for emitting light that has been introduced into the light guide plate 3 in a direction approaching the liquid crystal display panel 110. In the following description, the front surface 3a of the light guide plate 3 is referred to as light exit surface 3a and the side surfaces 3c of the light guide plate 3 are referred to as light incident surfaces 3c.

The optical sheets 4 are a group of sheets including a diffusing sheet, a lenticular sheet, a DBEF sheet (a reflective polarizing sheet), and the like. The optical sheets 4 are put on the light exit surface 3a of the light guide plate 3. Light emitted from the light exit surface 3a of the light guide plate 3 is diffused, collected, and processed in other ways by the optical sheets 4.

The light source module 5 is for generating light that is to be introduced into the light guide plate 3, and is installed beside each of the light incident surfaces 3c of the light guide plate 3. The light source module 5 is structured such that a plurality of LEDs 7 are mounted on a mounting surface 6a of the same printed board 6. The printed board 6 is an example of a "substrate" of the present invention, and the LEDs 7 are an example of "dot light sources" of the present invention.

Figure 3:
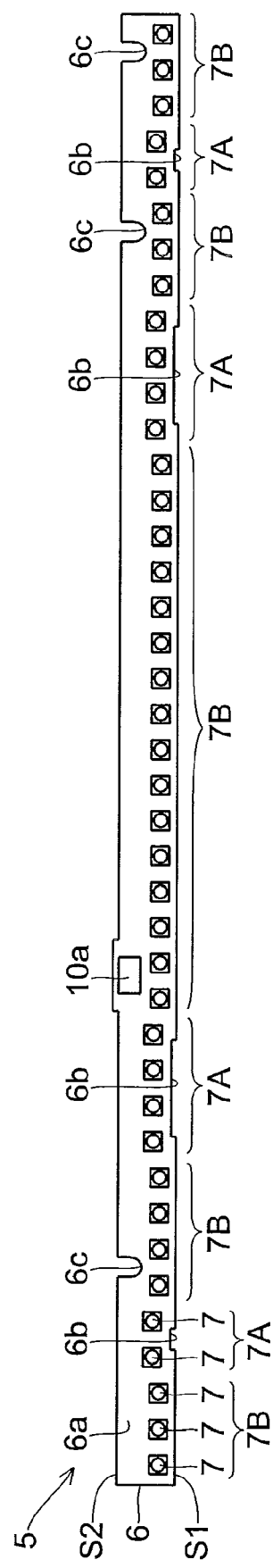
FIG. 3 is a plan view of an LED module that is installed in the backlight unit according to the first embodiment.

The printed board 6 has, as illustrated in FIGS. 1 to 3, an elongated shape stretching in a predetermined direction (direction along the light incident surfaces 3c of the light guide plate 3). The printed board 6 is disposed such that the mounting surface 6a faces one of the light incident surfaces 3c of the light guide plate 3. The plurality of LEDs 7 mounted on the mounting surface 6a of the printed board 6 are arranged along the longitudinal direction of the printed board 6 and, on the whole, closer to one longer side S1 of the printed board 6 than the other longer side S2 of the printed board 6. Because the mounting surface 6a of the printed board 6 faces the light incident surface 3c of the light guide plate 3, the plurality of LEDs 7 mounted on the mounting surface 6a of the printed board 6 face the light incident surface 3c of the light guide plate 3 as well. FIG. 1 illustrates fewer LEDs 7 than their actual number in order to simplify the drawing.

As illustrated in FIG. 2, an L-shaped fixing bracket 8 is provided in a predetermined portion of the bottom of the back chassis 1 (a portion beside each of the light incident surfaces 3c of the light guide plate 3). The printed board 6 is fastened to the fixing bracket 8, to thereby keep the mounting surface 6a of the printed board 6 (the plurality of LEDs 7 mounted on the mounting surface 6a of the printed board 6) opposed to one of the light incident surfaces 3c of the light guide plate 3. The fixing bracket 8 also optimizes the positional relation between the mounting surface 6a of the printed board 6 (the plurality of LEDs 7 mounted on the mounting surface 6a of the printed board 6) and the light incident surface 3c of the light guide plate 3. The mounting surface 6a of the printed board 6 (the plurality of LEDs 7 mounted on the mounting surface 6a of the printed board 6) needs to be positioned relative to the light incident surface 3c of the light guide plate 3 with high precision in order to efficiently introduce light from the plurality of LEDs 7 into the light guide plate 3.

Figure 4:
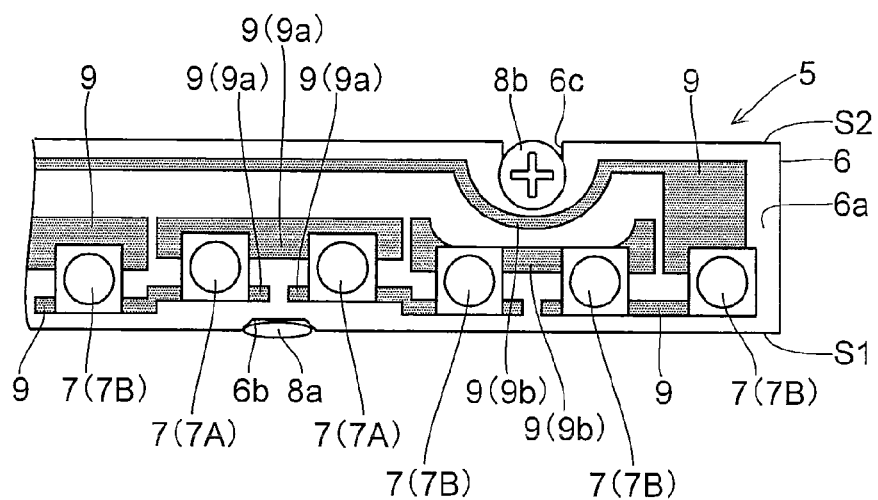
FIG. 4 is a partial, enlarged, plan view of the LED module that is installed in the backlight unit according to the first embodiment.

The printed board 6 is fastened to the fixing bracket 8 by, as illustrated in FIGS. 3 and 4, utilizing notches (fixing portions) 6b and 6c, which are formed along one longer side S1 of the printed board 6 and along the other longer side S2, respectively. Specifically, the notches 6b along the longer side S1 of the printed board 6 are cut into the printed board 6 from the longer side S1 toward the longer side S2 to be engaged with fixing projections 8a, which are formed in the fixing bracket 8 (see FIG. 2).

The notches 6c along the longer side S2 of the printed board 6 are cut into the printed board 6 from the longer side S2 toward the longer side S1 to be fastened to the fixing bracket 8 (see FIG. 2) with screws 8b. The fixing bracket 8 therefore has screw holes into which the screws 8b are screwed, though not illustrated in the drawing.

The printed board 6 may be fixed with the use of double-sided tape instead of screws. However, considering the work of detaching the printed board 6 after fixing the printed board 6 (rework), screws are a better way to hold the printed board 6.

Figure 5:
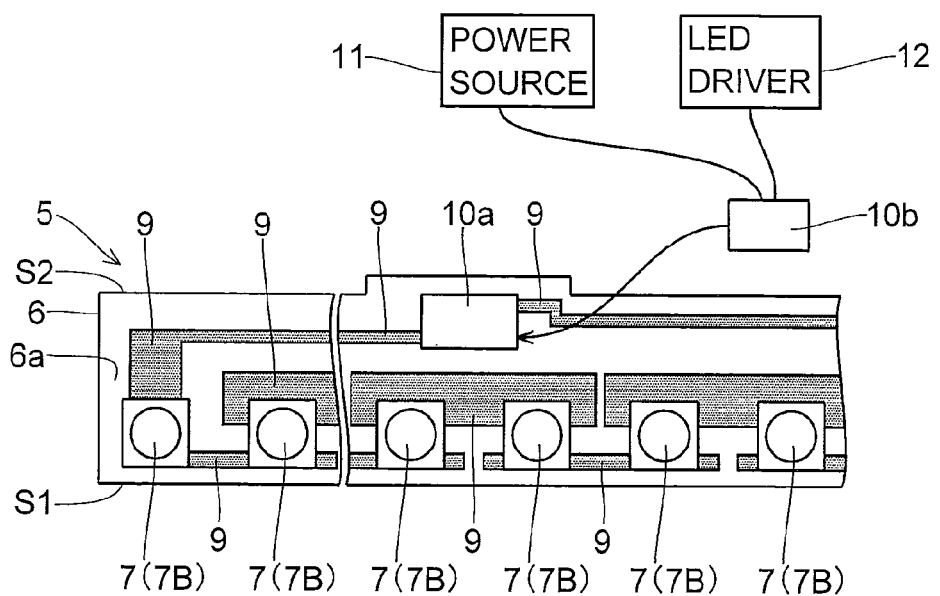
FIG. 5 is a partial, enlarged, plan view of the LED module that is installed in the backlight unit according to the first embodiment.
Figure 6:
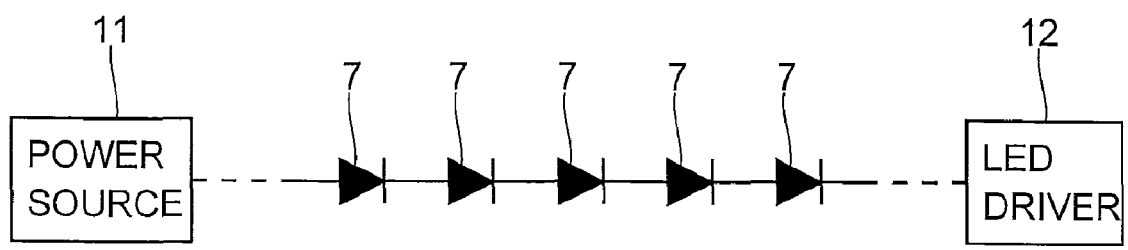
FIG. 6 is a circuit diagram of the LED module that is installed in the backlight unit according to the first embodiment.

As illustrated in FIGS. 4 and 5, metal wiring patterns (for example, copper foil patterns) 9 are provided on the same surface of the printed board 6 as the mounting surface 6a. The metal wiring patterns 9 electrically connect anodes and cathodes of adjacent LEDs 7. Thus, the plurality of LEDs 7 on the whole are connected in series (see FIG. 6). With the printed board 6 having those metal wiring patterns 9 on the same surface as the mounting surface 6a, there is no need to prepare a wiring member separately, and the number of parts is accordingly reduced.

A connector (female) 10a connected to the metal wiring patterns 9 is also provided on the same surface of the printed board 6 as the mounting surface 6a. The anode of an LED 7 at a first stage and the cathode of an LED 7 at a last stage are electrically connected to the connector (female) 10a via the metal wiring patterns 9.

A connector (male) 10b connected to a power source 11 and to an LED driver 12 is plugged into the connector (female) 10a. When the connector (male) 10b is plugged into the connector (female) 10a, the anode of the LED 7 at the first stage is electrically connected to the power source 11 and the cathode of the LED 7 at the last stage is electrically connected to the LED driver 12 (see FIG. 6). In this manner, the power source 11 supplies an electric current to the plurality of LEDs 7 and the LED driver 12 controls the driving of the plurality of LEDs 7.

A solder resist (not shown) is provided on the same surface of the printed board 6 as the mounting surface 6a, to thereby protect the metal wiring patterns 9 from an external impact or a corrosive substance. The solder resist commonly has a green color but may be white in order to enhance the light reflectance on the mounting surface 6a of the printed board 6.

As described in the section "Description of Related Art" as a problem to be solved by the present invention, a sufficient distance needs to be secured between one metal wiring pattern 9 and another metal wiring pattern 9 or between an outer edge of the printed board 6 and one of the metal wiring patterns 9. In other words, a sufficient creepage distance needs to be secured.

To this end, as illustrated in FIG. 4, partial metal wiring patterns 9a of the metal wiring patterns 9 that are in the vicinity of the notches 6b along the longer side S1 of the printed board 6 are displaced toward the longer side S2 of the printed board 6, or reduced in line width. A sufficient creepage distance is secured also by displacing partial metal wiring patterns 9b of the metal wiring patterns 9 that are in the vicinity of the notches 6c along the longer side S2 of the printed board 6 toward the longer side S1 of the printed board 6, or by giving a reduced line width to those partial metal wiring patterns 9b. Displacing the partial metal wiring patterns 9a of the metal wiring patterns 9 toward the longer side S2 of the printed board 6 causes the mount point of a predetermined number of LEDs 7 that are to be bonded (mounted) to the partial metal wiring patterns 9a of the metal wiring patterns 9 to be displaced toward the longer side S2 of the printed board 6 with respect to the mount point of the other LEDs 7. In other words, a necessary creepage distance is secured by not aligning the plurality of LEDs 7 on the same straight line (a straight line running in the longitudinal direction of the printed board 6).

The mount point is displaced toward the longer side S2 of the printed board 6 only for the predetermined number of LEDs 7 that are located in the vicinity of the notches 6b along the longer side S1 of the printed board 6 because displacing the mount point of all of the plurality of LEDs 7 toward the longer side S2 of the printed board 6 makes it difficult to secure a necessary creepage distance in the vicinity of the notches 6c, which are provided along the longer side S2 of the printed board 6.

In the first embodiment, as illustrated in FIGS. 3 and 4, the LEDs 7 whose mount point is displaced toward the longer side S2 of the printed board 6 are classified as an LED group 7A, whereas the LEDs 7 whose mount point is not displaced toward the longer side S2 of the printed board 6 are classified as an LED group 7B. The LED groups 7A and 7B are examples of a "first light source group" and a "second light source group" of the present invention, respectively.

Figure 7:
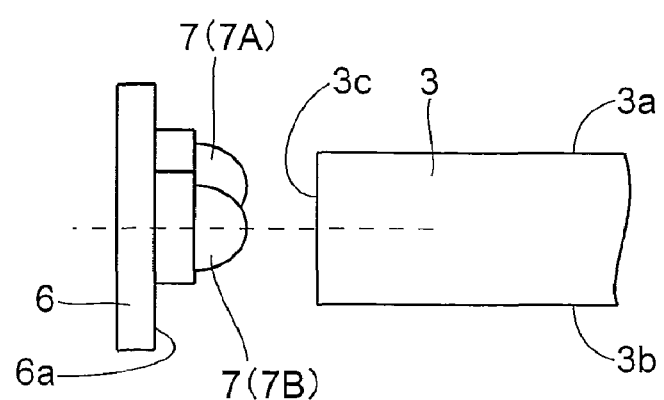
FIG. 7 is a diagram illustrating a positional relation between the LED module that is installed in the backlight unit and a light guide plate according to the first embodiment.

The mount points of the LED groups A and B have positional relations illustrated in FIG. 7 with the relevant light incident surface 3c of the light guide plate 3. In FIG. 7, the mount point of the LED group 7A is closer to an edge of the light incident surface 3c of the light guide plate 3 (the edge where the light incident surface 3c meets the light exit surface 3a), whereas the mount point of the LED group 7B is closer to the center of the light incident surface 3c of the light guide plate 3 in the thickness direction of the light guide plate 3. In short, the mount points of the LED groups 7A and 7B are displaced from each other in the thickness direction of the light guide plate 3.

In the first embodiment, the total luminance of the LED group 7A is set higher than the total luminance of the LED group 7B. Specifically, the luminous flux of the LEDs 7 that belong to the LED group 7A is set larger than the luminous flux of the LEDs 7 that belong to the LED group 7B.

The first embodiment structured as above reduces, the difference between the light incidence efficiency in regions which light emitted from the LED group 7A enters out of all the regions of the light incident surface 3c of the light guide plate 3 and the light incidence efficiency in regions of the light incident surface 3c which light emitted from the LED group 7B enters.

Figure 8:
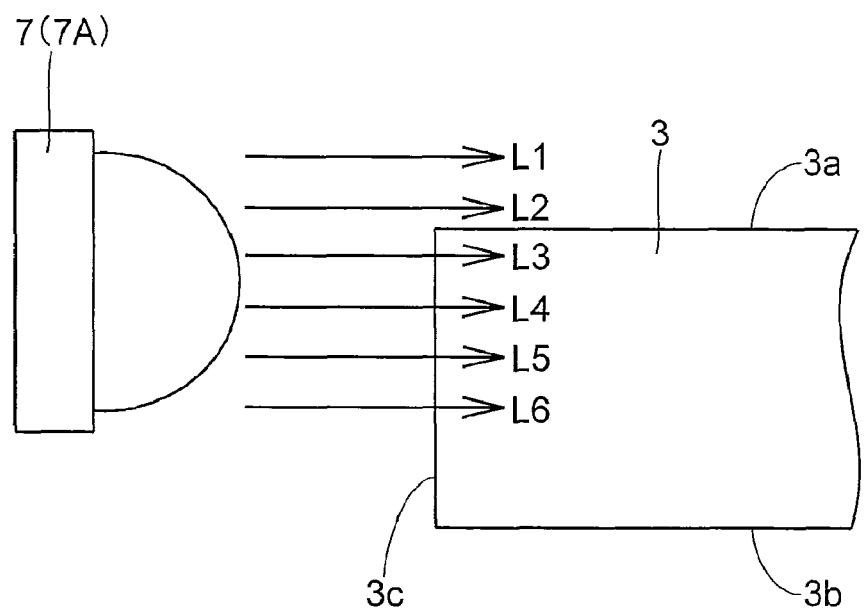
FIG. 8 is a diagram illustrating an effect of the first embodiment.
Figure 9:
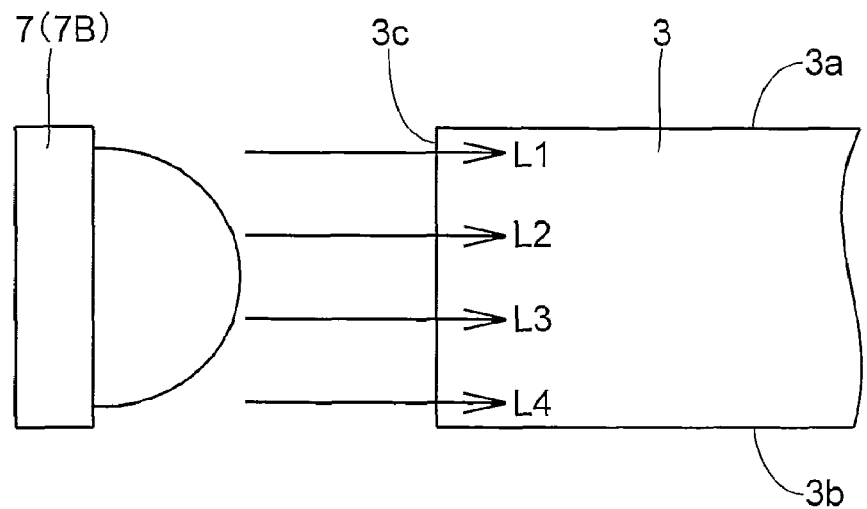
FIG. 9 is a diagram illustrating the effect of the first embodiment.

To give a concrete description with reference to FIGS. 8 and 9, because the luminous flux of the LEDs 7 that belong to the LED group 7A is set larger than the luminous flux of the LEDs 7 that belong to the LED group 7B, the amount of light emitted from each LED 7 that belongs to the LED group 7A (the number of arrows in FIG. 8) is larger than the amount of light emitted from each LED 7 that belongs to the LED group 7B (the number of arrows in FIG. 9). In regions which light emitted from the LED group 7A enters out of all regions of the relevant light incident surface 3c of the light guide plate 3, components of light that correspond to arrows L3 to L6 (four arrows) in FIG. 8 enter the light incident surface 3c of the light guide plate 3 while components of light that correspond to arrows L1 and L2 are lost. In regions of the light incident surface 3c, which light emitted from the LED group 7B enters, on the other hand, components of light that correspond to arrows L1 to L4 (four arrows) in FIG. 9 enter the light incident surface 3c of the light guide plate 3. In short, the amount of incident light (the number of arrows) is substantially the same in the regions which light emitted from the LED group 7A enters and in the regions which light emitted from the LED group 7B enters. Therefore, the difference is small between the light incidence efficiency in the regions which light emitted from the LED group 7A enters and the light incidence efficiency in the regions which light emitted from the LED group 7B enters. The arrows illustrated in FIGS. 8 and 9 schematically represent light emitted from the respective LEDs 7.

Light incidence is thus made substantially uniform throughout all the regions of each light incident surface 3c of the light guide plate 3, and there is accordingly less chance of uneven luminance.

Another effect of the first embodiment where, as described above, the luminous flux of the LEDs 7 that belong to the LED group 7A is set larger than the luminous flux of the LEDs 7 that belong to the LED group 7B, is that the total luminance of the LED group 7A is easily made higher than the total luminance of the LED group 7B.

Second Embodiment

A description is given below with reference to FIG. 10 on the structure of a light source module that is installed in a backlight unit according to a second embodiment of the present invention.

Figure 10:
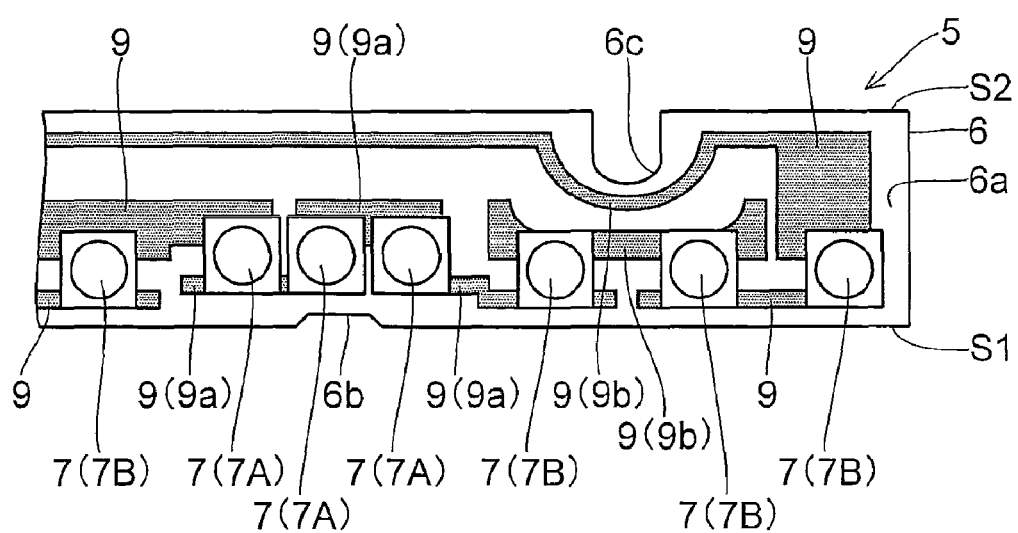
FIG. 10 is a partial, enlarged, plan view of an LED module that is installed in a backlight unit according to a second embodiment of the present invention.

In the second embodiment, as illustrated in FIG. 10, the total luminance of the LED group 7A is made higher than the total luminance of the LED group 7B by setting the mount density of the LED group 7A higher than the mount density of the LED group 7B. Specifically, the interval (pitch) between the LEDs 7 adjacent to each other in the longitudinal direction of the printed board 6 is narrower in the LED group 7A than in the LED group 7B. The LEDs 7 that belong to the LED group 7A and the LEDs 7 that belong to the LED group 7B have a substantially equal luminous flux in the second embodiment.

The rest of the structure of the second embodiment is the same as the structure of the first embodiment described above.

In the second embodiment structured as above, the difference is small between the light incidence efficiency in regions which light emitted from the LED group 7A enters out of all regions of the relevant light incident surface 3c of the light guide plate 3 and the light incidence efficiency in the regions of the light incident surface 3c which light emitted from the LED group 7B enters, as in the first embodiment. Light incidence is thus made substantially uniform throughout all the regions of the light incident surface 3c of the light guide plate 3, with the result that there is less chance of uneven luminance.

Another effect of the second embodiment where, as described above, the mount density of the LED group 7A is set higher than the mount density of the LED group 7B, is that the total luminance of the LED group 7A is easily made higher than the total luminance of the LED group 7B.

Moreover, in the case of the second embodiment, the total luminance of the LED group 7A is higher than the total luminance of the LED group 7B despite the LEDs 7 that belong to the LED group 7A and the LEDs 7 that belong to the LED group 7B having an equal luminous flux. This eliminates the need to prepare different types of LEDs 7 which have different luminous fluxes.

Experiments conducted to confirm the effects of the first embodiment and the second embodiment are described below.

In those confirmatory experiments, the light source module 5 according to the first embodiment (see FIG. 11) was fabricated first as Example 1, and then the light source module 5 according to the second embodiment (see FIG. 12) was fabricated as Example 2.

Figure 11:
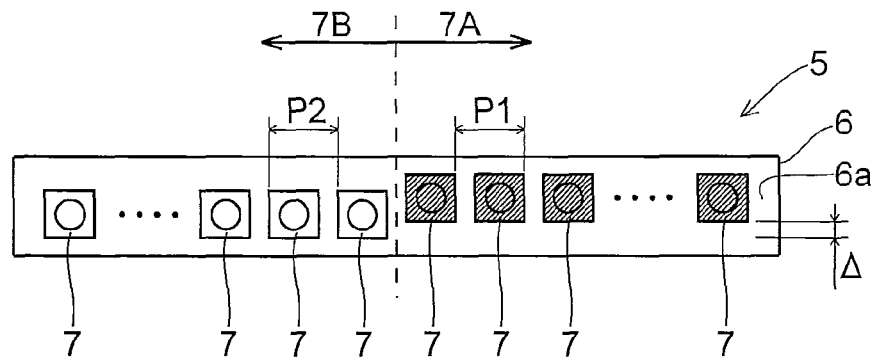
FIG. 11 is a plan view of an LED module according to Example 1 (an LED module used in an experiment that was conducted to confirm effects of the present invention).

In Example 1, as illustrated in FIG. 11, the mount point of the LED group 7A and the mount point of the LED group 7B were displaced from each other by a displacement amount $\Delta$ of 1 mm. The luminous flux of the LEDs 7 belonging to the LED group 7A (125 lm) was set larger than the luminous flux of the LEDs 7 belonging to the LED group 7B (104 lm). A mount pitch P1 of the LED group 7A and a mount pitch P2 of the LED group 7B were both set to 8.1 mm to give the LED group 7A and the LED group 7B an equal mount density. The LEDs 7 that have the larger luminous flux are hatched in FIG. 11.

Figure 12:
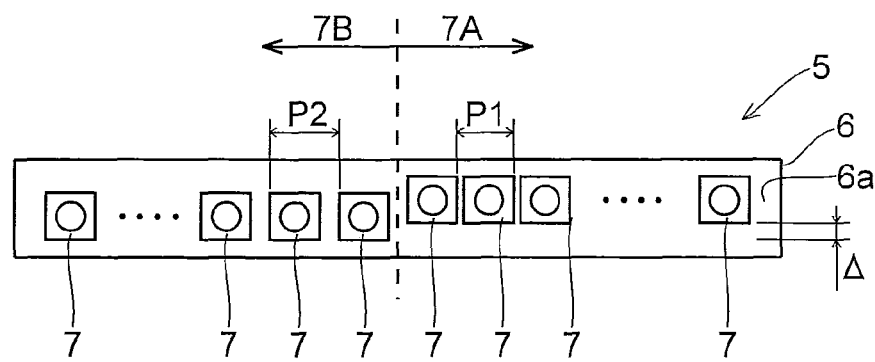
FIG. 12 is a plan view of an LED module according to Example 2 (an LED module used in another experiment that was conducted to confirm effects of the present invention).

In Example 2, as illustrated in FIG. 12, the mount point of the LED group 7A and the mount point of the LED group 7B were displaced from each other by a displacement amount $\Delta$ of 1 mm. The LEDs 7 belonging to the LED group 7A and the LEDs 7 belonging to the LED group 7B were given an equal luminous flux. The mount pitch P1 of the LED group 7A was set to 7.1 mm whereas the mount pitch P2 of the LED group 7B was set to 8.1 mm, to thereby make the mount density of the LED group 7A higher than that of the LED group 7B.

Figure 13:
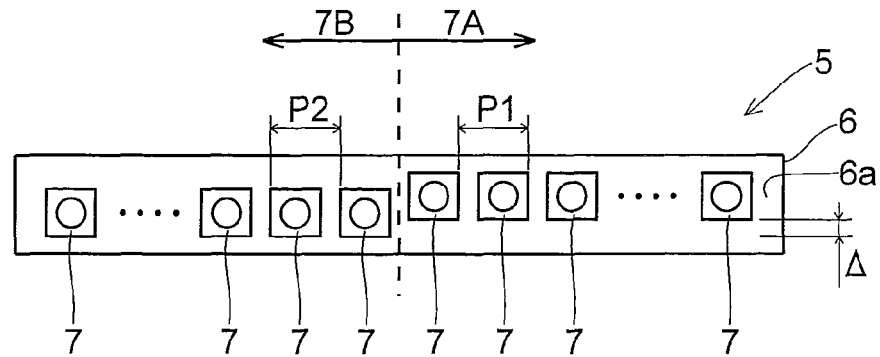
FIG. 13 is a plan view of a light source module according to Comparative Example (a light source module used in still another experiment that was conducted to confirm effects of the present invention).

As Comparative Example to compare Example 1 and Example 2 against, the light source module 5 illustrated in FIG. 13 was fabricated. In this Comparative Example, the mount point of the LED group 7A and the mount point of the LED group 7B were displaced from each other by a displacement amount $\Delta$ of 1 mm. The LEDs 7 belonging to the LED group 7A and the LEDs 7 belonging to the LED group 7B were given an equal luminous flux. The mount pitch P1 of the LED group 7A and the mount pitch P2 of the LED group 7B were both set to 8.1 mm to give the LED group 7A and the LED group 7B an equal mount density.

Figure 14:
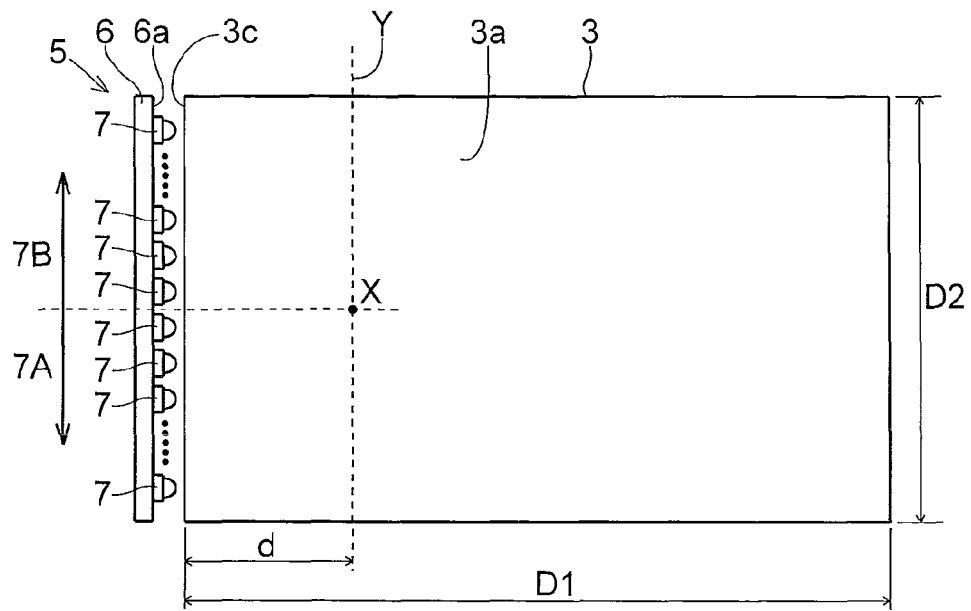
FIG. 14 is a diagram illustrating the experiments conducted to confirm effects of the present invention.
Figure 15:
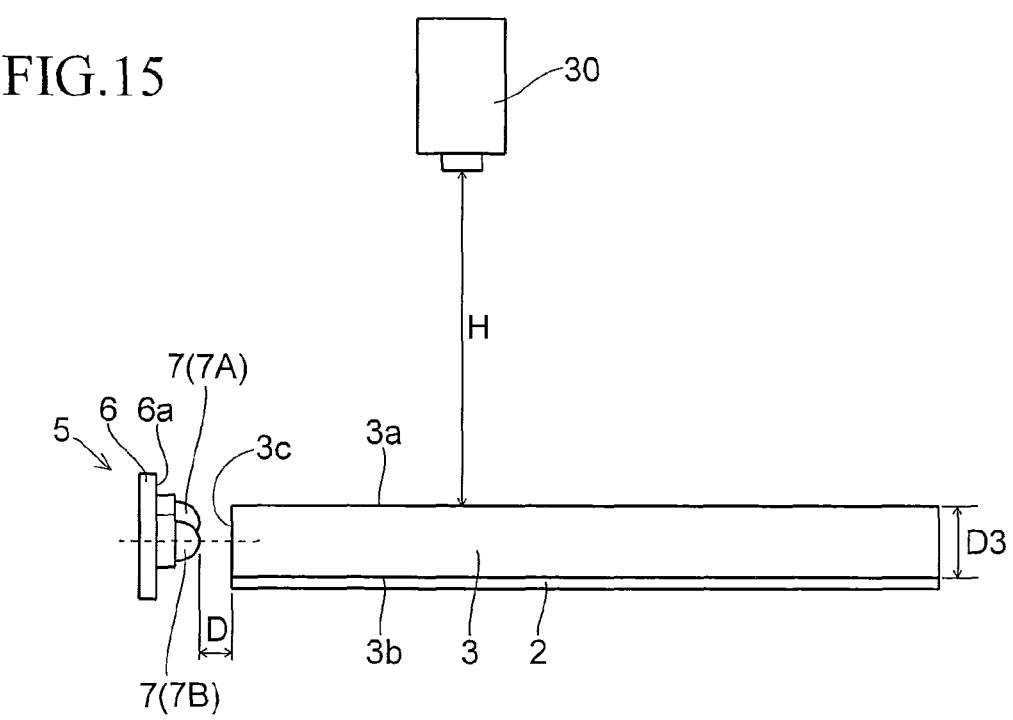
FIG. 15 is a diagram illustrating the experiments conducted to confirm effects of the present invention.

In addition to those light source modules 5, the light guide plate 3 and the reflective sheet 2 were prepared to cover the rear surface 3b of the light guide plate 3 with the reflective sheet 2 as illustrated in FIGS. 14 and 15. The light guide plate 3 used was made from a methyl polymethacrylate resin (a product of Mitsubishi Rayon Co., Ltd.) and measured 390 mm×320 mm×4 mm in outer size (D1×D2×D3). The reflective sheet 2 used was made from polyethylene terephthalate-isophthalate copolymer/barium sulfate (a product of Teijin DuPont Films Japan Limited).

In each experiment, the light source module 5 was then placed to face one of the light incident surfaces 3c of the light guide plate 3. The positional relation of the light source module 5 with the light incident surface 3c of the light guide plate 3 was such that the apex of each LED 7 (the apex of the dome) belonging to the LED group 7B and the center of the light incident surface 3c of the light guide plate 3 in the thickness direction of the light guide plate 3 substantially coincided with each other. An interval D between the light incident surface 3c of the light guide plate 3 and the apex of each LED 7 was set to 2 mm.

For each of Example 1, Example 2, and Comparative Example, the luminance distribution over the light exit surface 3a of the light guide plate 3 was measured with the use of a two-dimensional luminance meter (CA-2000, a product of Konica Minolta Sensing, Inc.) 30. In measuring the luminance distribution, the two-dimensional luminance meter 30 was set up above the light exit surface 3a of the light guide plate 3, and a distance H between the two-dimensional luminance meter 30 and the light exit surface 3a of the light guide plate 3 was set to 700 mm. A broken line Y in FIG. 14 represents actual measurement points, which are at a distance d (100 mm) from the light incident surface 3c of the light guide plate 3. A dot X in FIG. 14 represents a reference point used in actual measurement, and corresponds to the boundary between the LED group 7A and the LED group 7B.

Figure 16:
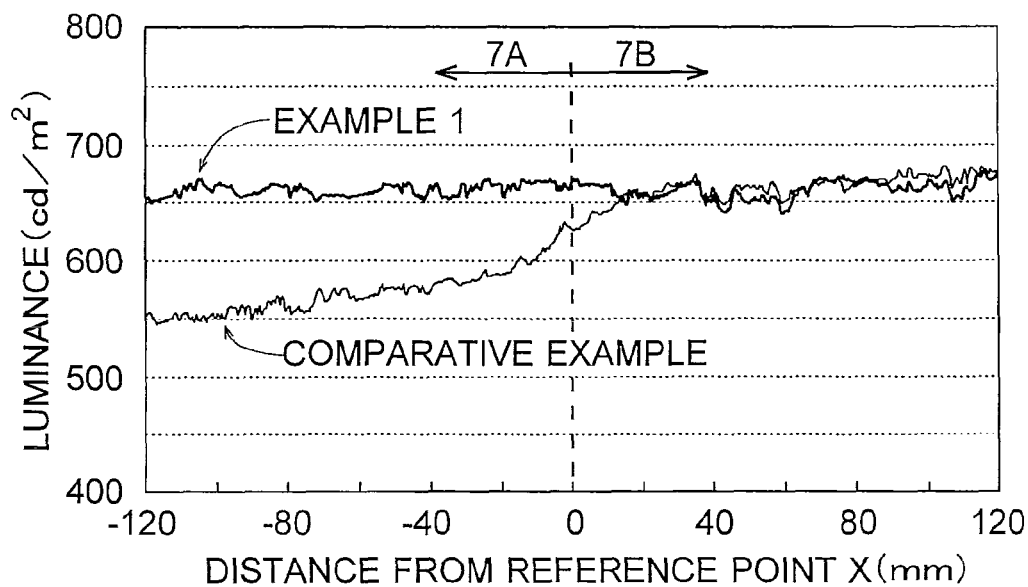
FIG. 16 is a graph showing results of the experiments that were conducted to confirm effects of the present invention.
Figure 17:
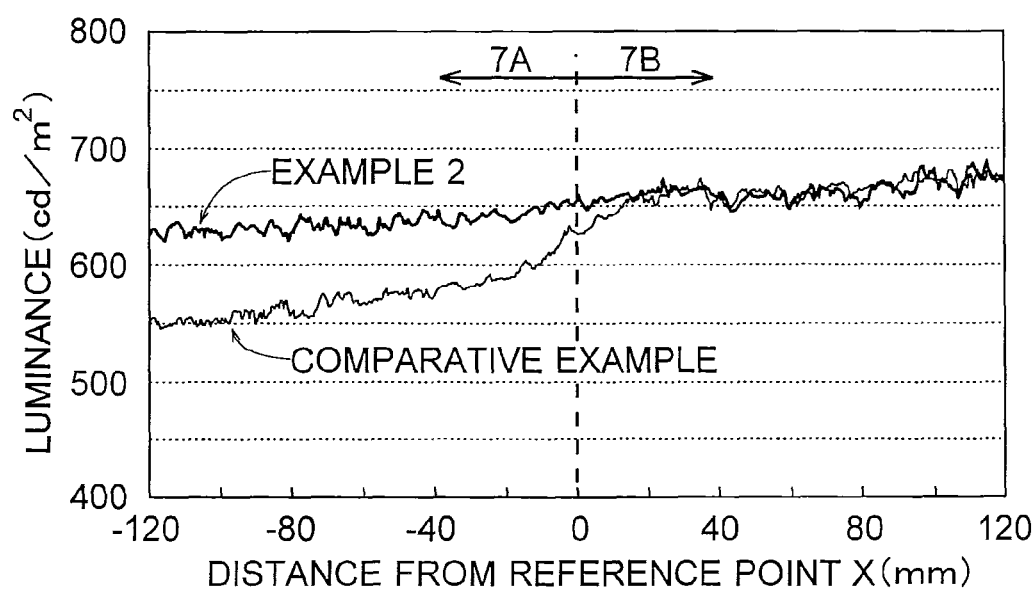
FIG. 17 is a graph showing results of the experiments that were conducted to confirm effects of the present invention.
Figure 18:
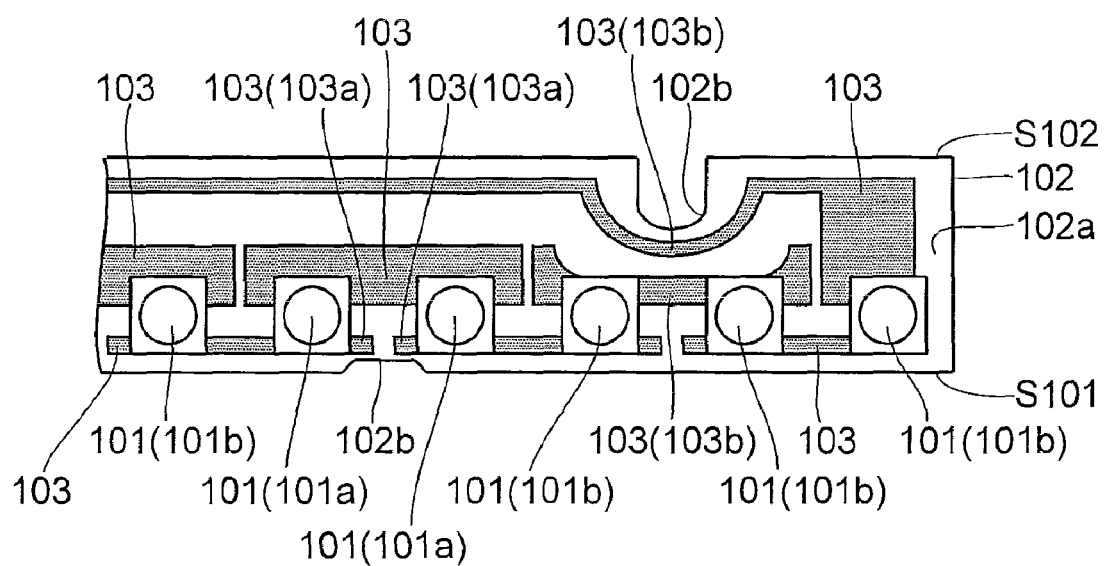
FIG. 18 is a partial, enlarged, plan view of an LED module that is installed in a conventional backlight unit.
Figure 19:
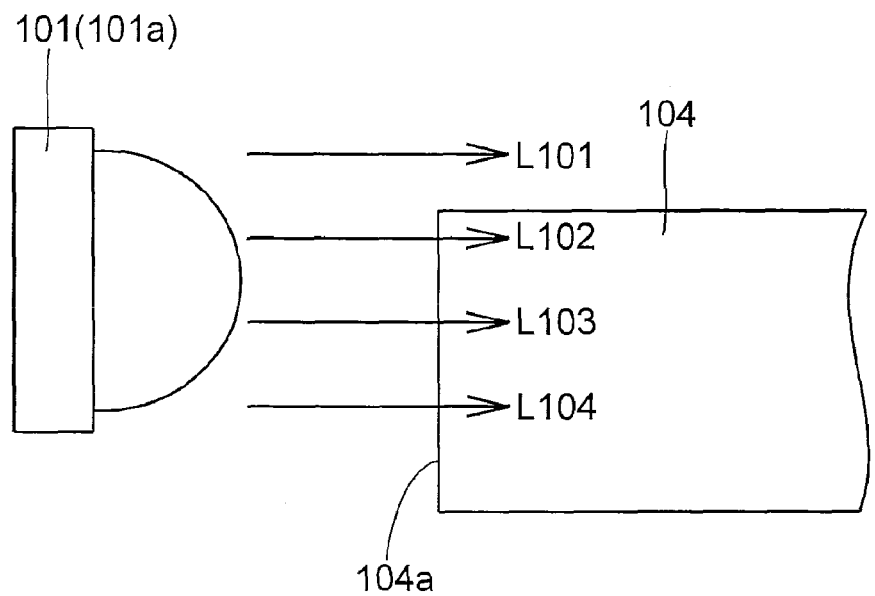
FIG. 19 is a diagram illustrating a problem of the conventional backlight unit.
Figure 20:
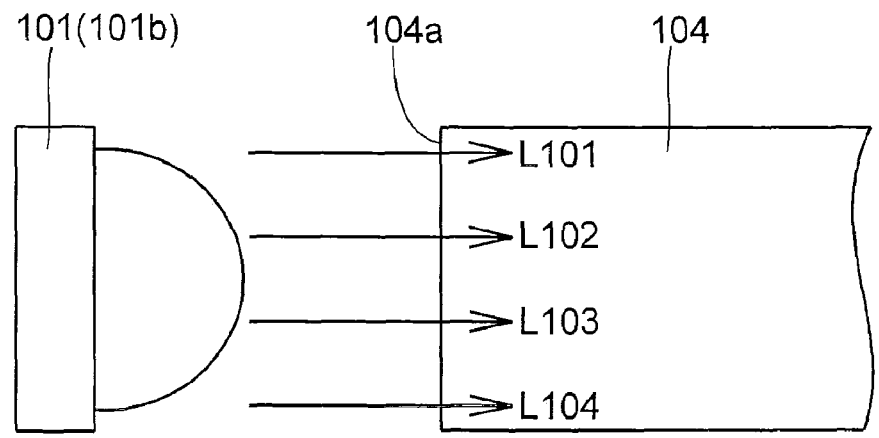
FIG. 20 is a diagram illustrating the problem of the conventional backlight unit.

Results of the measurement were as shown in FIGS. 16 and 17.

Specifically, in Comparative Example, the difference between the maximum luminance (680.76 cd/m$^2$) and the minimum luminance (545.02 cd/m$^2$) was 135.74 cd/m$^2$. In contrast, the difference between the maximum luminance (675.91 cd/m$^2$) and the minimum luminance (640.17 cd/m$^2$) was 35.74 cd/m$^2$ in Example 1, and the difference between the maximum luminance (688.3 cd/m$^2$) and the minimum luminance (619.56 cd/m$^2$) was 68.74 cd/m$^2$ in Example 2. It is thus concluded that Example 1 and Example 2 are improved in the uniformity of luminance and have less chance of uneven luminance compared to Comparative Example.

Note that, it should be construed that the embodiment disclosed in this specification is illustrated by way of example, and is not limitative in all aspects. The scope of the following claims, rather than the above-mentioned embodiment, is to be accorded the broadest interpretation of the present invention so as to encompass all such modifications and equivalent structures and functions.

What is claimed is:

1. A backlight unit, comprising:
   a substrate which has an elongated shape and a mounting surface;
   a plurality of dot light sources which are mounted on the mounting surface of the substrate and arranged in a longitudinal direction of the substrate; and
   a light guide plate which has a plurality of elongated side surfaces and which is placed so that a predetermined side surface of the plurality of elongated side surfaces opposes the mounting surface of the substrate, the predetermined side surface serving as a light incident surface into which light from the plurality of dot light sources is introduced,
   wherein the plurality of dot light sources are classified into a first light source group and a second light source group, and a mount point of the first light source group and a mount point of the second light source group are displaced from each other in a thickness direction of the light guide plate, and wherein a total luminance of the first light source group is higher than a total luminance of the second light source group, in order that an amount of incident light is substantially the same from both the first light source group and the second light source group along the light incident surface for substantial uniformity.

2. A backlight unit according to claim 1, wherein the mount point of the first light source group is off a center of the light incident surface of the light guide plate in the thickness direction of the light guide plate, and the mount point of the second light source group is closer to the center of the light incident surface of the light guide plate.

3. A backlight unit according to claim 1, wherein the substrate has a fixing portion formed near the mount point of the first light source group along one longer side of the substrate in order to fix the substrate, and wherein the mount point of the first light source group and the mount point of the second light source group are displaced from each other in the thickness direction of the light guide plate by displacing the mount point of the first light source group from the one longer side of the substrate toward another longer side of the substrate with respect to the mount point of the second light source group.

4. A backlight unit according to claim 3, wherein the fixing portion of the substrate comprises a notch cut into the substrate from the one longer side of the substrate toward the another longer side of the substrate.

5. A backlight unit according to claim 3, wherein the substrate has a metal wiring pattern provided on the same surface of the substrate as the mounting surface, and the plurality of dot light sources are bonded to the metal wiring pattern, and wherein a portion of the metal wiring pattern, which is bonded to dot light sources belonging to the first light source group is displaced from the one longer side of the substrate toward the another longer side of the substrate with respect to a portion of the metal wiring pattern, which is bonded to dot light sources belonging to the second light source group.

6. A backlight unit according to claim 1, wherein dot light sources belonging to the first light source group are larger in luminous flux than dot light sources belonging to the second light source group.

7. A backlight unit according to claim 1, wherein the first light source group is higher in mount density than the second light source group.

8. A backlight unit according to claim 7, wherein dot light sources belonging to the first light source group and dot light sources belonging to the second light source group have an equal luminous flux.

9. A display device, comprising the backlight unit according to claim 1.

* * * * *